July 25, 1933.   W. EWALD   1,919,625
AUTOMATIC FIRE PROTECTION DAMPER
Filed Nov. 1, 1930   9 Sheets-Sheet 1

INVENTOR
Warren Ewald
BY Chas. M. C. Chapman
ATTORNEY

July 25, 1933.　　　　　W. EWALD　　　　　1,919,625

AUTOMATIC FIRE PROTECTION DAMPER

Filed Nov. 1, 1930　　　9 Sheets-Sheet 2

INVENTOR
Warren Ewald
BY
Chas. M.E. Chapman
ATTORNEY

July 25, 1933. W. EWALD 1,919,625
AUTOMATIC FIRE PROTECTION DAMPER
Filed Nov. 1, 1930 9 Sheets-Sheet 5

INVENTOR:
Warren Ewald
BY
Chas. M. E. Chapman
ATTORNEY

July 25, 1933.　　　　W. EWALD　　　　1,919,625
AUTOMATIC FIRE PROTECTION DAMPER
Filed Nov. 1, 1930　　　9 Sheets-Sheet 6
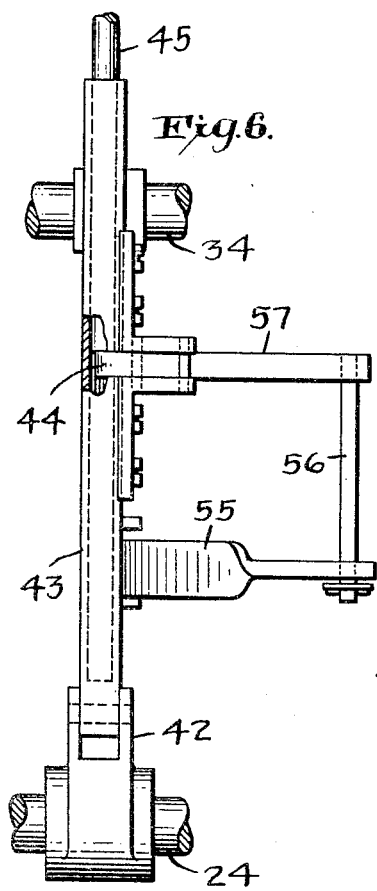
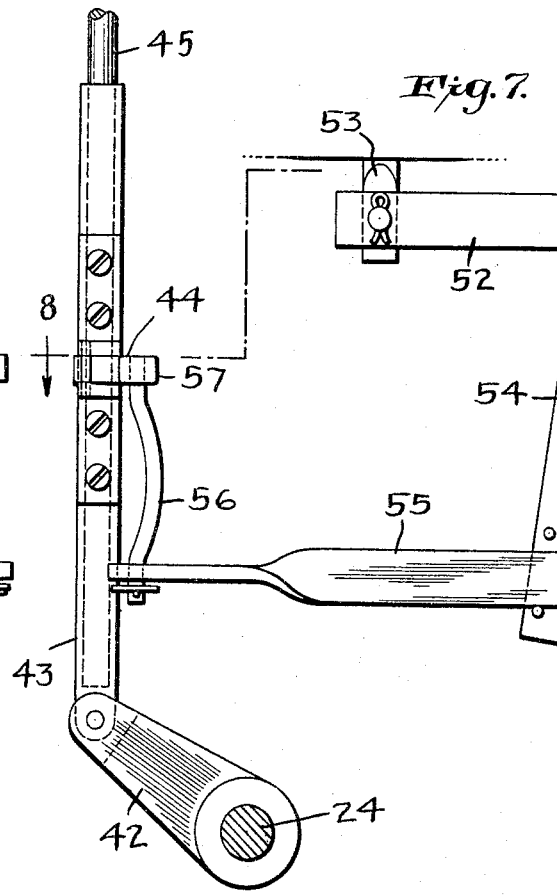
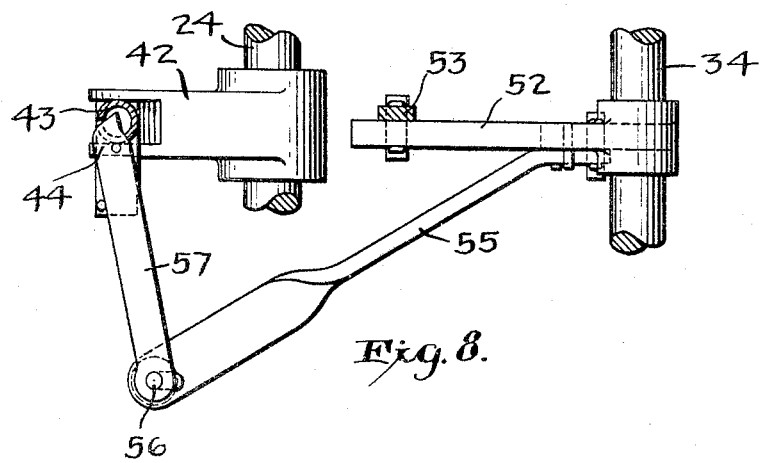

July 25, 1933.  W. EWALD  1,919,625

AUTOMATIC FIRE PROTECTION DAMPER

Filed Nov. 1, 1930  9 Sheets-Sheet 7

INVENTOR
Warren Ewald
BY
Chas. M. C. Chapman
ATTORNEY

July 25, 1933. W. EWALD 1,919,625
AUTOMATIC FIRE PROTECTION DAMPER
Filed Nov. 1, 1930 9 Sheets-Sheet 8

INVENTOR
Warren Ewald
BY
Chas. McC. Chapman
ATTORNEY

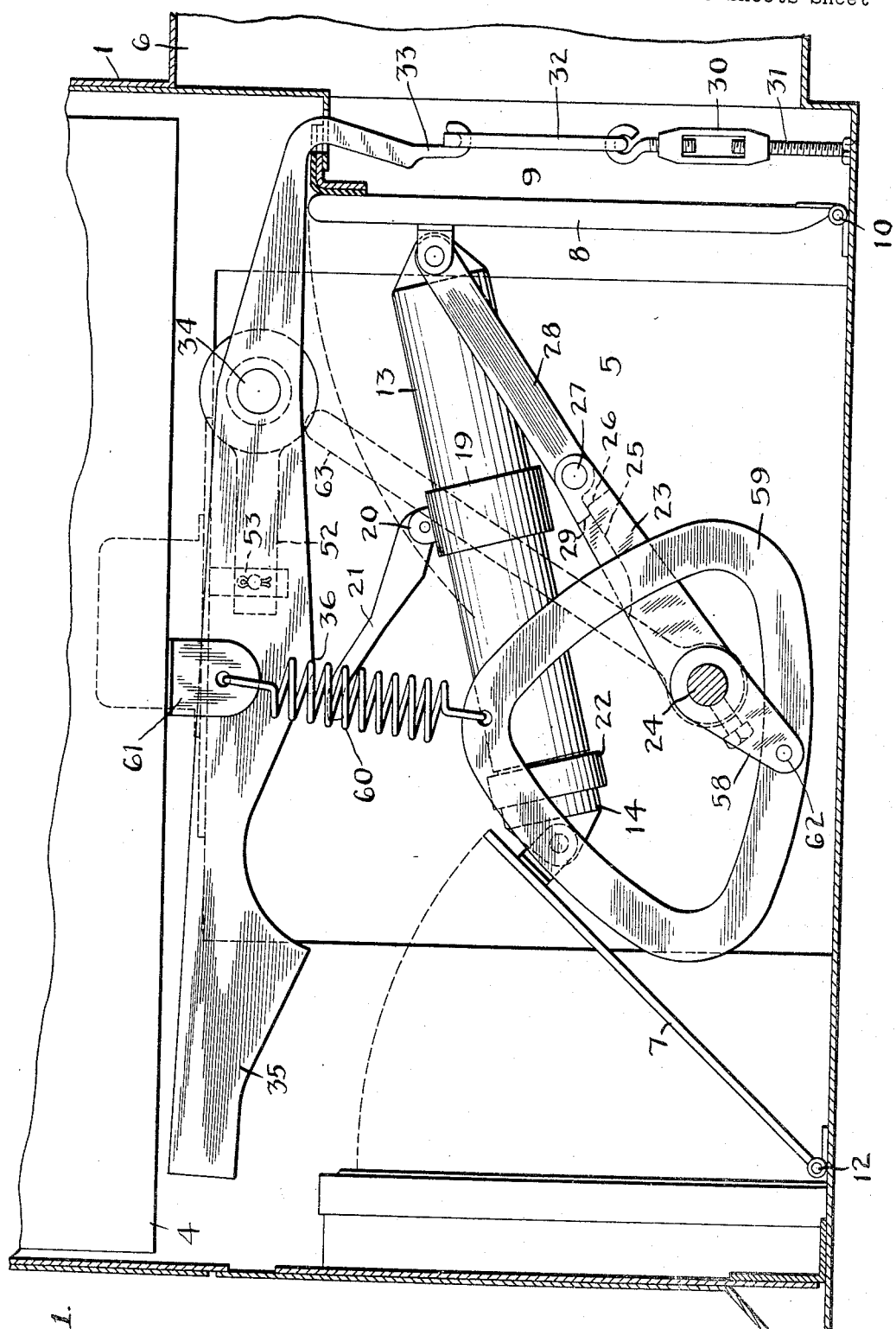

Patented July 25, 1933

1,919,625

UNITED STATES PATENT OFFICE

WARREN EWALD, OF ARDSLEY, PENNSYLVANIA, ASSIGNOR, BY MESNE ASSIGNMENTS, TO JOHN J. NESBITT, INC., OF HOLMESBURG-PHILADELPHIA, PENNSYLVANIA, A CORPORATION OF PENNSYLVANIA

AUTOMATIC FIRE PROTECTION DAMPER

Application filed November 1, 1930. Serial No. 492,703.

This invention has reference to the art of heating and ventilating, and particularly relates to a unit for heating and ventilating purposes which is capable of heating a predetermined space or of maintaining a predetermined temperature therein, either by direct discharge into that space or by recirculation of the air contained in said space, and which may also function to shut out excessive heat, fire, water or other objectionable fluids by tightly sealing the unit at two opposite points. The invention, therefore, covers the idea of means and function of protection against fire, which may occur in the neighborhood of the inlet chamber of the unit, and shutting out or barring from entrance to the unit air or fluids carrying excessive temperature or temperatures in excess of a predetermined degree and of so locking and sealing the unit as to prevent external pressure from breaking down the protection afforded by the means employed for the purposes.

Among the objects of my invention may be noted the following: to provide a heating and ventilating unit with a fire door protection which may be automatically closed and or locked rigidly against movement; to provide such a unit with a fire or flame resistant fresh air inlet damper so operated and controlled as to seal and positively lock shut the said damper against external force; to provide a unit such as described with means for automatically shutting and locking the fresh air and fire protection damper, and simultaneously shutting and locking the recirculating damper if it be open, and automatically shutting and locking either the fresh air and fire protection damper or the recirculating damper, according to which one may be open, in the event of fire or the presence of excessive heat, or heat of a predetermined temperature; to provide a heating and ventilating unit with means whereby, should the fire protection damper or fresh air inlet damper be momentarily opened, objectionable fluids or excessive heat entering the unit cannot pass directly through the same, but may be either confined therein or caused to pass entirely through the unit according to the condition of the dampers arranged therein; and to provide a combination of simple, effective elements and mechanisms which will operate automatically, if desired, or may be operated manually, and which will carry out all the modes of operation and perform all the functions outlined in the foregoing and set forth in my pending application filed August 2, 1930, Ser. No. 472,710, Patent #1,898,821, on the mechanism and functions of which the invention of this application constitutes an improvement.

With the above objects in view and others which will be detailed during the course of this description, my invention consists in the parts, features, elements, mechanisms and combinations thereof hereinafter described and claimed.

In order that my invention may be clearly understood, I have provided drawings wherein:

Figure 6 is a view showing details of the telescopic rod and its tripping mechanism;

Figure 7 is a view of the same parts at a right-angle thereto;

Figure 8 is a sectional plan view taken on the line 8—8 of Figure 7;

Figure 11 is an enlarged detail sectional view taken on the line 11—11 of Figure 9.

Figure 1:
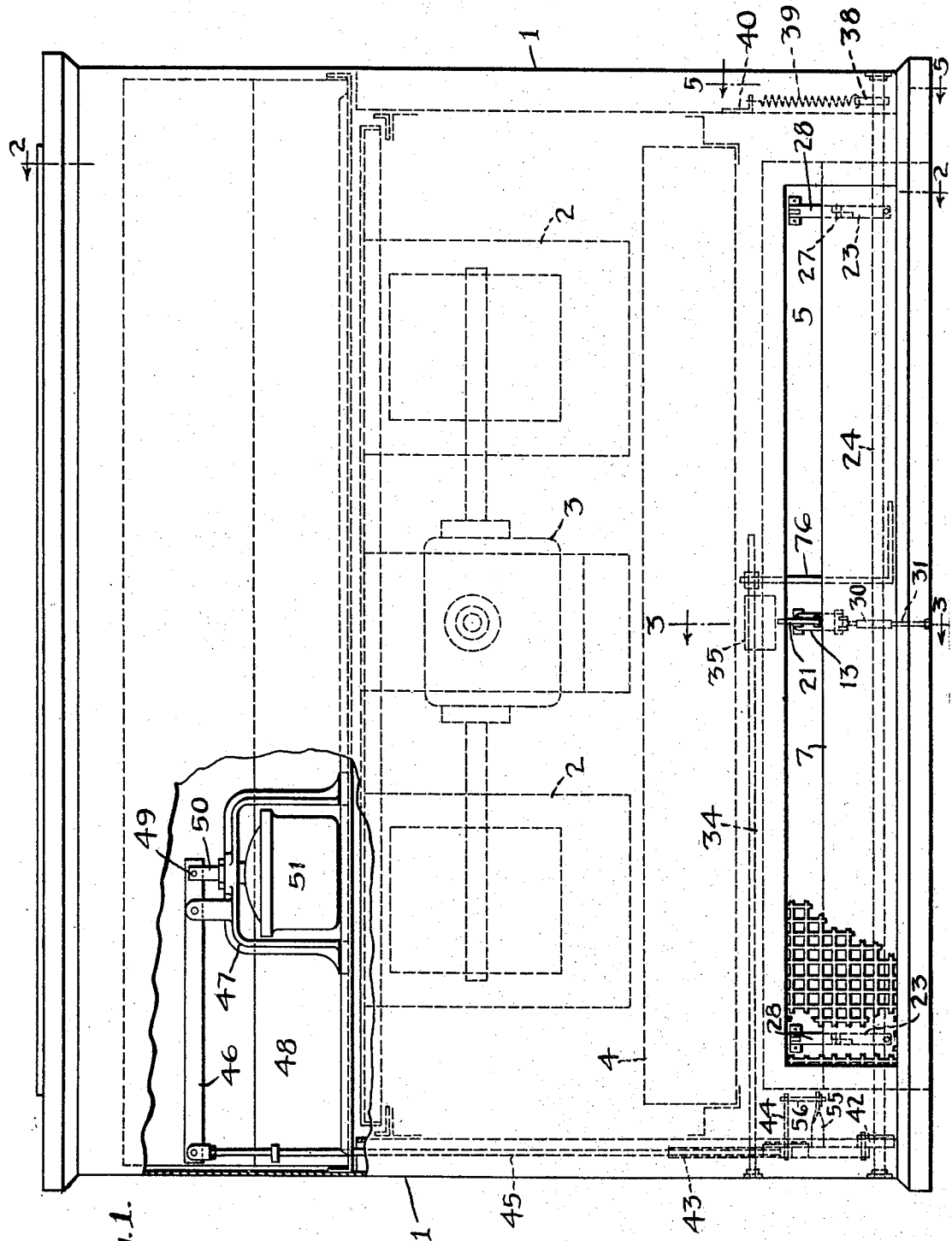
Figure 1 is a view showing a unit in front elevation embodying my invention in its automatic form, parts being broken away and interior mechanism being shown in dotted lines.
Figure 2:
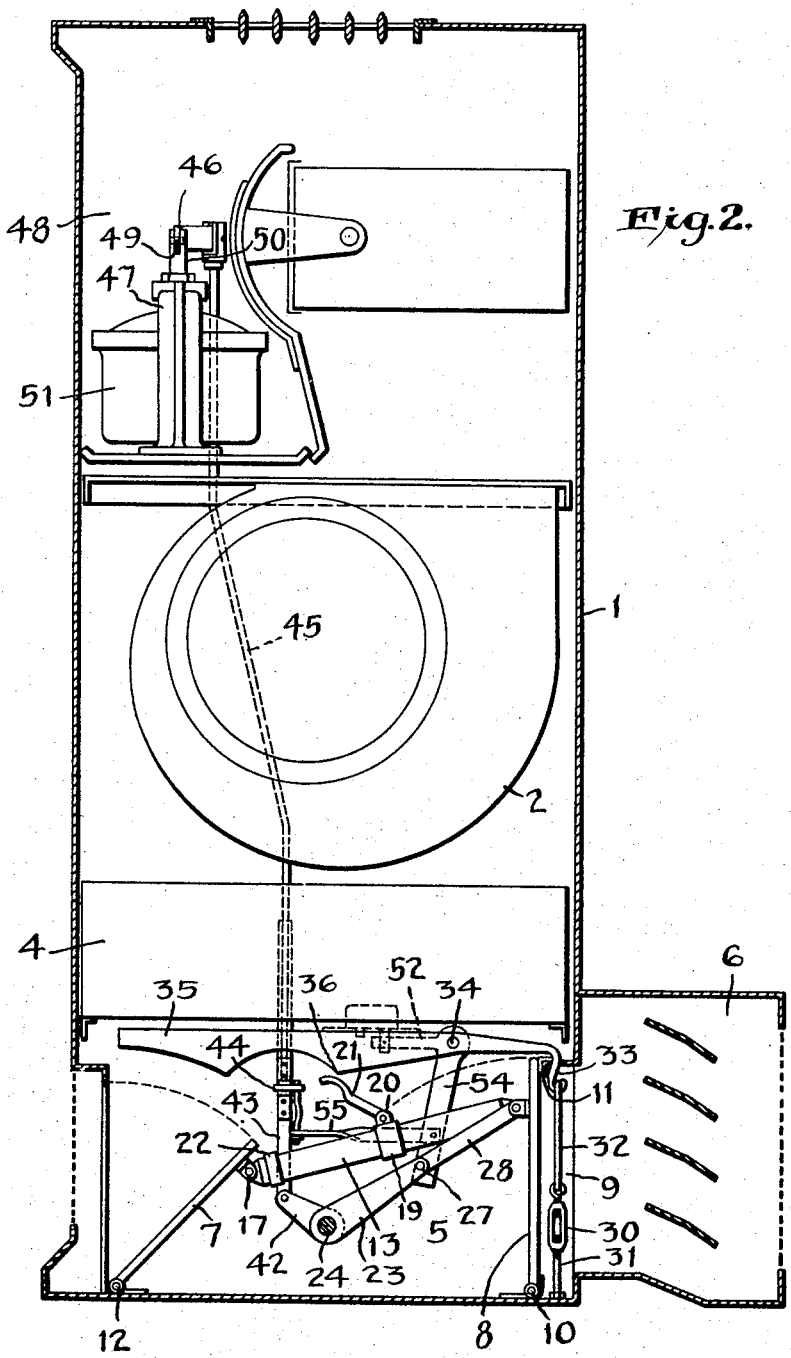
Figure 2 is a sectional view taken on the line 2—2 of Figure 1, looking in the direction of the arrows.

Referring to the drawings, the numeral 1 indicates the casing of my unit which is rectangular in form, it being understood that the discharge of air, heated or otherwise, from the unit is in a vertical jet from the top of the unit; and it being also understood that blowers (two of them) indicated at 2 are operated by a motor 3, the motor and blowers being arranged above, or it may be below, a filter 4 through which the air passes before being driven into the room of installation of the unit. The unit in this instance is provided at its bottom with a fresh air chamber 5, at the back of which is constructed an inlet chamber 6 provided with any usual form of grille and damper or baffles. At the front of the casing a grille is also provided the opening through which is barred by the recirculating damper 7, while the chamber 5, at its rear end, is closed by the inlet and fire damper 8. The two dampers 7 and 8 are pivoted at their lower edge to the bottom of the casing, and are connected so as to be simultaneously actuated. This operation may be such that one of the dampers is closed and the other is opened, according to conditions surrounding the unit, or according to the operation desired from the unit; or if one of the dampers is wide open and the other closed, the open damper may be automatically shut if conditions surrounding the unit, or adjacent the unit, be such as to require such operation. The fresh-air and fire damper 8 is or may be composed of fire resistant material such as asbestos held between metallic plates. This is suggestive and not to be taken as a limitation. Preferably, the damper 8 is set somewhat within the chamber 5 so as to leave a space 9 between it and the inlet chamber 6 for the purposes presently described. The damper 7 may be likewise set at the front of the casing. The pivot of damper 8 is at the bottom 10 and at its top edge the damper contacts with a fire resistant abutment 11 against which it fits tightly and snugly. The pivot of damper 7 is likewise at its bottom 12.

Figure 3:
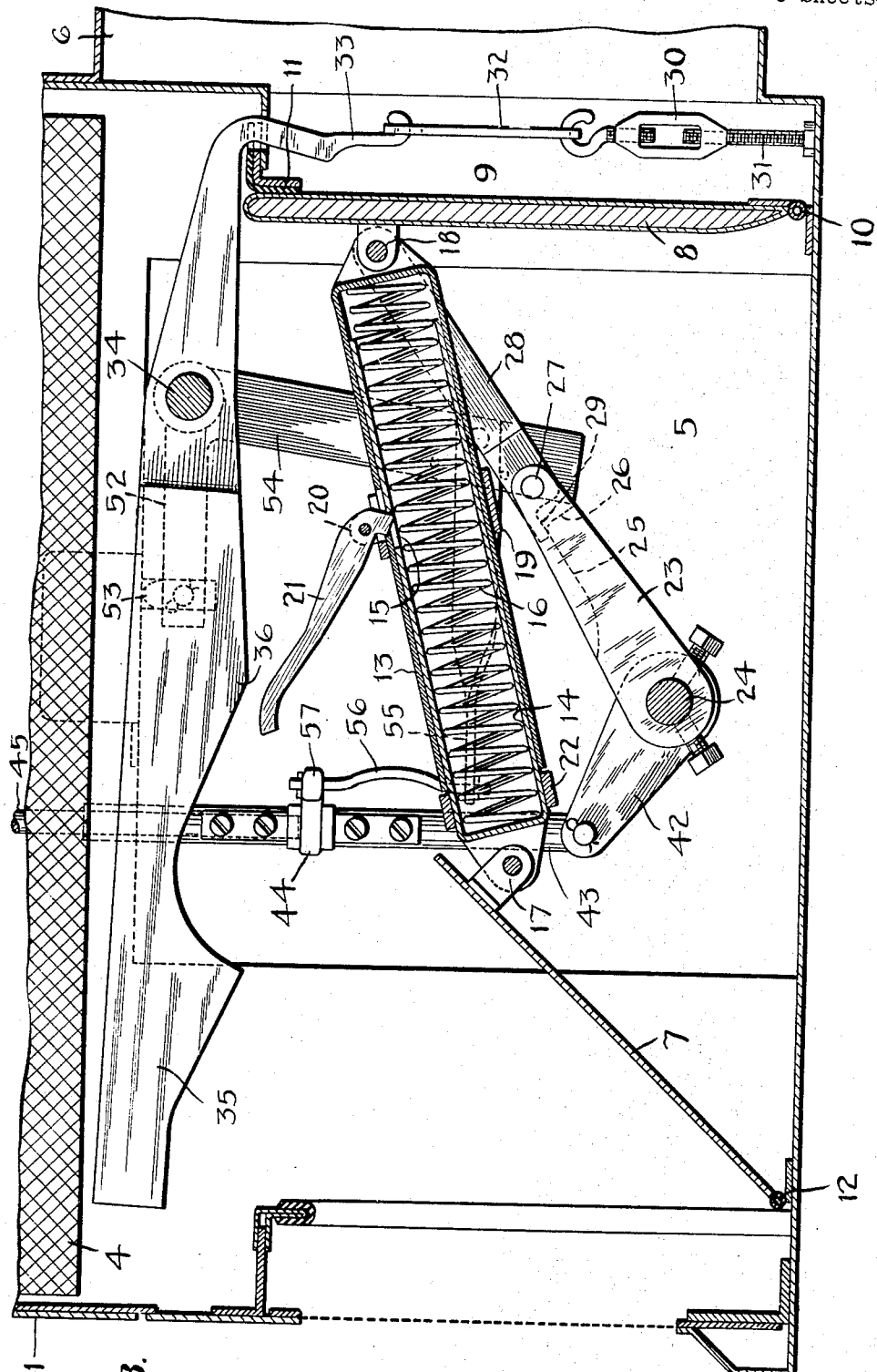
Figure 3 is an enlarged detail sectional elevation taken on the line 3—3 of Figure 1, this view showing the fire damper closed, the recirculating damper open, and the fusible link set for operation.
Figure 4:
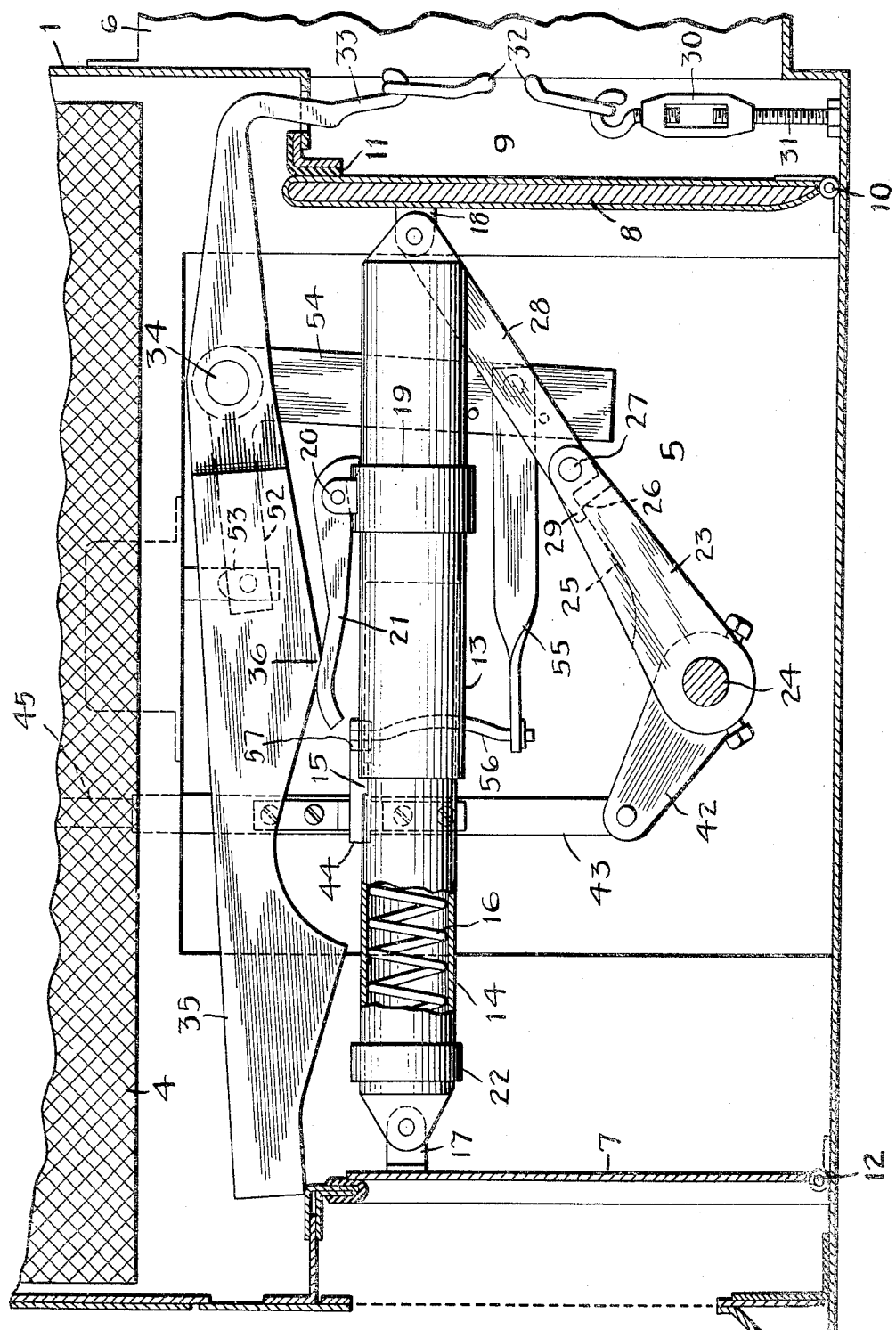
Figure 4 is a view similar to Figure 3 taken on the same section line showing the power mechanism expanded, the toggle locking means set, the fusible link broken, and both the dampers closed.
Figure 5:
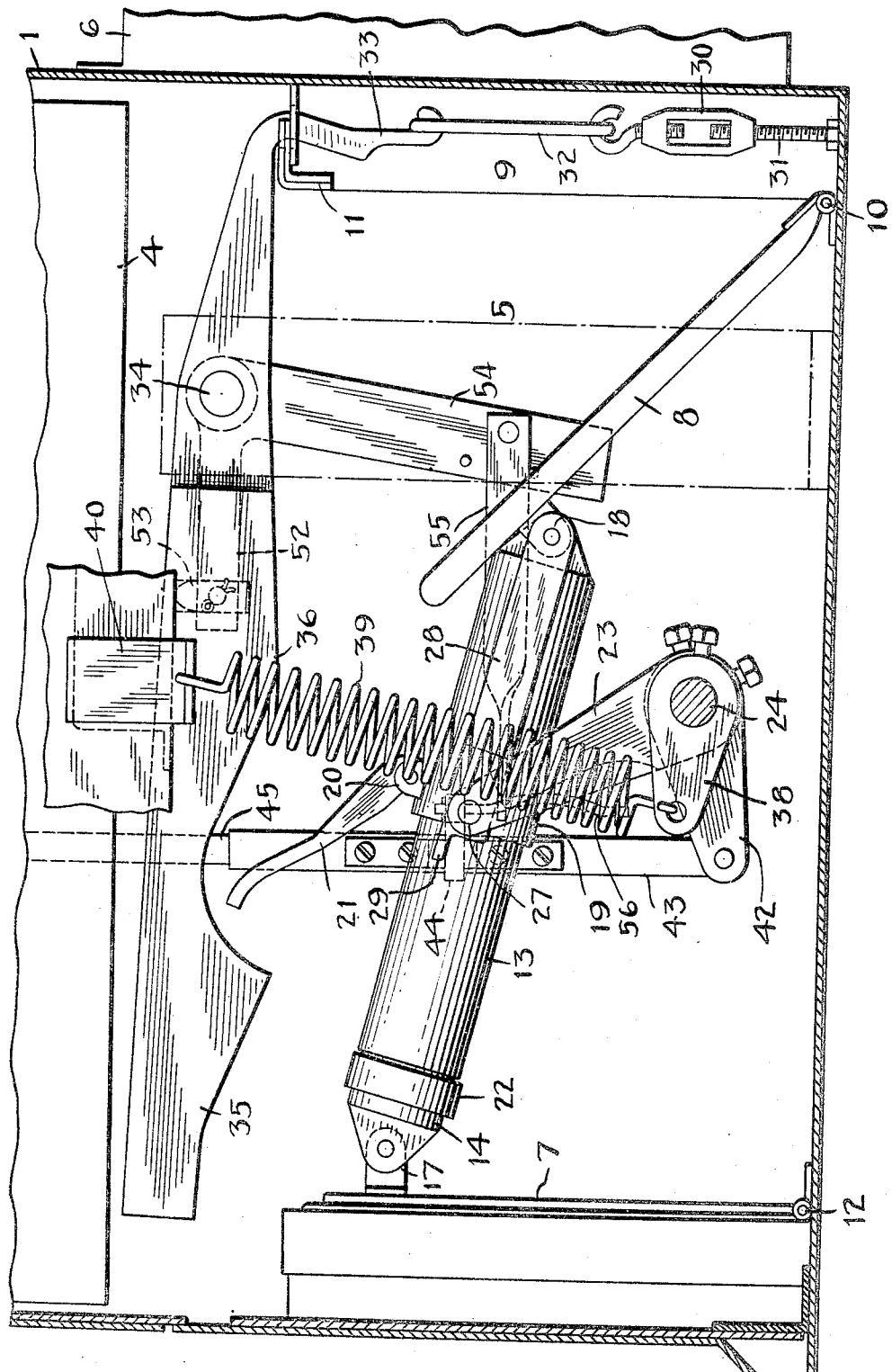
Figure 5 is a view similar to Figures 3 and 4, taken on the line 5—5 of Figure 1, the parts being shown with the fusible link set, and the parts in position holding the fire damper open and the recirculating damper closed.

According to my present invention, the recirculating damper 7 and the inlet or fire damper 8 are connected for simultaneous operation by means of a telescoping, tubular link the outer member of which is indicated at 13 and the inner member of which is indicated at 14, the latter being provided with a slot or aperture 15 at a suitable point in its length. The outer end of each of the members is closed, and the inner end thereof is open, providing a chamber in which is confined a strong expansion spring 16, the opposite ends of which normally act against the closed end of the tubular members 13 and 14. Each of these members is pivotally connected to ears carried by the dampers 7 and 8, the one connection being indicated at 17 and the other at 18. The outer tubular member 13 is provided with a fixed collar 19 having a projection affording a pivotal support at 20 for a trigger 21 which, when properly shifted, may have its short end passed through an aperture in member 13 and entered into the aperture 15 of the inner tubular member 14 so as to hold the spring 16 under compression or power-stored and the members 13 and 14 in their shortened or set condition. To render certain the operation of the trigger 21, a fixed stop collar 22 is secured to the exterior of the inner tubular member 14 near its pivotal end, said stop limiting the movement of the outer tubular member 13, thus making it possible to certainly set the trigger with the spring under full compression, as shown in Figure 3. From this construction it will be seen that normally the power member just described functions as a mere linkage between the dampers 7 and 8 and operates to open one of the dampers when the other is closed, the opposite positions of said dampers being shown in Figure 5. In the position of Figure 3, the fresh air inlet or fire damper is closed and the recirculating damper is open, the unit thus being caused to function as a recirculating medium for the air within the room or space of installation of the unit. In this position of the dampers, there is a locking mechanism which holds the damper 8 rigidly in closed position so as to resist any external force or pressure which may be imposed upon the fire damper. Said mechanism consists of the arm 23 fixed upon the main or operating shaft 24 which extends from side to side or lengthwise of the unit, said shaft being mounted, in any suitable manner, within the unit approximately centrally thereof between its front and back walls and a suitable distance above the bottom of the unit. The arm 23 is provided in its top surface with a depression 25, which terminates in a shoulder 26 near the outer end of the arm which is pivoted at 27 to a link 28, pivoted at its outer end to an ear on the inside of the damper 8. The link 28 is provided on one side with a short lip 29 adapted to engage the surface of the depression 25 in the arm 23. Thus a stop toggle is provided which will break-joint when the damper 8 is to be opened, and which will lock-joint by contact of the lip 29 with the surface of the recess 25 when the damper 8 is closed. And it will be noted that, when the fire damper 8 is in the closed position and the recirculating damper 7 is in the open position, as in Figure 3, the power link is cocked and ready for action should there be an excessive amount of heat on the outside of the fire damper in the chamber 9. Thus the mechanism is primed ready for any event. On the other hand, should the fire damper be open and the recirculating damper closed, the toggle 23—28 is akimbo and the power link has assumed an inclination the reverse of that shown in Figure 3, operating still as a link, as shown in Figure 5. However, with the members in either position, should an excessive amount of heat or a flame pour into the chamber 9, certain functions will be performed by medium of the following mechanism:

In the chamber 9, at its bottom, is set a turn buckle 30 anchored by the screw-rod 31 to the bottom of the unit, the other end of the turn buckle having hooked thereto a fusible link 32, the other end of which is connected to the short angular end 33 of a weighted lever connected to a rock-shaft 34, and having its longer straight arm 35 provided centrally with a tripping projection 36. The shaft 34 is journaled in the casing above the damper 8 parallel with the shaft 24. In the position of the parts shown in Figure 3, there remains only the necessity for closing the recirculating damper 7, should conditions be such as to cause the fusible link 32 to melt, thus releasing the weighted lever 35, which, when it drops, will trip the trigger 21 by contact of the projection 36 with the long arm of said trigger. Thus, the inner tube 14 is released and the spring 16 is permitted to expand. In so doing, the spring will drive the tube 14 outwardly, thus shifting the damper 7 to its closed position, without altering the position of the fire damper. The unit is thus sealed against the admission of objectionable fluids and the fire damper is rigidly locked closed against external pressure. On the other hand, should the recirculating damper 7 be closed and the fire damper be open and the power mechanism locked, as before noted, the fusing of the link, the dropping of the weighted lever, and tripping of the trigger will enable the spring 16 to expand, thus closing the fire damper 8 and simultaneously setting the toggle joint so as to positively and rigidly lock the fire damper against external pressure. Other functions will be performed through the operation of the following mechanism, simultaneously, or approximately so, with the operations and functions above noted, viz:

Viewing Figures 1 to 8, it will be noted that the shaft 24 carries a short arm 38 at approximately a right-angle to the arm 23, the outer end of which arm 38 has hooked thereto a spring 39, the upper end of which is hooked to a lug 40 on either the bottom of the filter 4 or a part of the frame of the unit, according to which is found most convenient. The spring 39 normally acts upon the arm 38 to turn the shaft 24 to cause the toggle 23—28 to lock-joint and hold the fire damper 8 in closed position. Viewing Figure 3, it will be seen that the shaft 24 carries a third arm 42, arranged at an obtuse angle approximately to the arm 23, the outer end of said arm 42 having pivotally connected thereto a tubular member 43 near the upper end of which is a pivoted trip arm 44 working through a slot in said member. The tubular member 43 has sliding therein a rod or telescoping member 45, the lower end of which rests on the trip arm 44. The upper end of the rod 45 is connected to a lever 46 fulcrumed to the bracket 47 suitably supported in the by-pass damper chamber 48 of the unit. The opposite end of the lever 46 is pivoted at 49 to the rod 50 carried by an expansible diaphragm (not shown) of a sylphon motor or suitable pump 51 such as shown in either of the patents to Callahan #1,390,758 or #1,754,260, wherein such a motor is shown for actuating the mixing damper and also for actuating the recirculating damper and inlet dampers. Normally, the pump operates to expand or elevate the diaphragm, thus causing the lever to rock and depress the rod 45, creating pressure upon the trip arm 44 and in turn depressing the tubular member 43 and arm 42, causing the shaft 24 to normally turn into the position shown in Figure 5, thus breaking the toggle 23—28 to open the fire damper 8 against the pulling tension of the spring 39, the latter being thus distended and having power stored therein ready to operate upon the arm 38 to turn the shaft 24 and shift the fire damper 8 to closed position and simultaneously shifting the toggle mechanism to lock-joint position. As shown in Figure 3, the shaft 34 has in appropriate position a bell-crank lever fixed thereto, the short arm 52 of which carries at its outer end a fixed contact member 53 adapted to normally engage the switch of the Bryant momentary contact, this being a well-known switch mechanism in the art. It may be well to note, however, that in this type of switch the circuit is closed or open as the case may be only while a contact button is held in. As soon as pressure is released, the switch automatically restores itself to its normal position with a quick action. Pressure on the button closes the circuit. Releasing the button opens the circuit. Thus a quick make and break is provided for. As shown in Figures 2, 3, 5, 7, 10 and 11, the Bryant switch is located conveniently for operation by the contact member 53 carried by the arm 52 fixed to the shaft 34, and in said figures the button is held in so as to close the circuit and enable the motor of the unit to operate. As shown in Figure 4, when the link 32 is broken, the button of the Bryant switch is released by the turning of the shaft 34 and the movement of the contact member 53 on the arm 52 of the bell crank lever is accomplished. The long arm 54 of the bell-crank has pivotally connected thereto a link 55 the outer end of which engages a trip bar 56 connected to the extended member 57 of the trip arm 44. Hence, when the link 32 is fused, releasing the weighted lever 35, the shaft 34 will turn, thus shifting the bell-crank 52—54 and breaking contact at 53. Also, the trip arm 44 will be shifted by bell-crank arm 54, link 55 and rod 56, thus allowing the rod 45 to descend to the bottom of the tube 43, thus relieving the pressure of the sylphon upon the arm 42 of the shaft 24, and permitting the spring 39 to take control of the shaft 34 and cause the shaft to turn so as to shift the toggle and cause it to lock-joint as soon as the fire damper 8 has been closed by the power spring 16. Simultaneously with the breaking of contact at 53 with the Bryant momentary contact switch, the motor of the unit will be stopped, the fans will cease turning, and no air will be either discharged from the unit or agitated within the latter. It will be noted that the trip bar 56 is given a bowed form, the object of which is to enable the same to compensate for the movement of the rock-arm 42 on the shaft 24 when said rock-arm is shifted by the sylphon through the medium of the telescopic rods; that is to say, when the sylphon operates to depress the rock-arm 42, the trip arm 44 will cause the trip bar 56 to descend relatively to the link 55 by sliding through the aperture in the end thereof. The bowed portion of the trip bar 56 is sufficient to compensate for the arcuate movement of the pivotal connection between the arm 42 and the tubular member of the telescopic rod without imparting any movement to the link 55 and the bell-crank lever.

To correlate the functions heretofore described, it will be seen that automatically, regardless of which damper (7 or 8) is open, when the link 32 is fused, the weighted lever 35 will drop, tripping the trigger 21, thus releasing the spring 16 to automatically shift the other damper and close it tightly. If this be the fire damper 8, the toggle mechanism will lock-joint under the impulse of the spring 39 released by the trip arm 44, the sylphon momentarily losing control. Simultaneously, contact 53 causes the momentary contact switch to open, thus cutting off the motor from its electric energy and stopping the latter and the fans. All the foregoing functions take place approximately simultaneously upon the happening of the single event of the fusing of the link 32. It will be seen that the power mechanism 13, 14, 16 performs the triple function of a link connection between the two dampers 7 and 8, and a power means for shifting one or the other of the dampers to closed position, and holding the two dampers in closed position. It will also be seen that instantly the fire damper is closed, the toggle mechanism will positively lock the same rigidly against outside pressure. And this rigid locking is aided by the contraction of spring 39, upon the automatic release of the shaft 24 from the influence of the sylphon motor when the trip arm is shifted.

As in my aforesaid application, I may apply to the shaft 24 an arm 58 with which is combined a mechanism operating to prevent the dampers 7 and 8 from stopping in an intermediate position between full-open and full-closed. This controlling mechanism, shown in Figures 9 and 11 may be appropriately arranged within the chamber 5 and consists of a triangular floating link 59 having a large opening through which the shaft 24 extends. At one vertex of the triangular link, a pull spring 60 is hooked and at its upper end said spring is hooked to a bracket or ear 61 connected to any pendent or conveniently adjacent portion of the casing or member mounted therein, such as the filter. The spring may normally hold the link 59 in the position shown in Figure 11, which is the position corresponding to that of the mechanism shown in Figures 1 to 8, wherein the fire damper 8 is held tightly closed and the recirculating damper is held wide open. The link 59 is pivotally mounted at 62 to the arm 58 so that, if the arm 58 is shifted by the shaft 24 in one direction corresponding to the shifting of the arm 23 to break the toggle joint, the spring 60 will be distended, the link 59 will be depressed and shifted laterally with the arm 58, while the toggle mechanism will be shifted to cause the fire damper, operating as an inlet damper, to be shifted to open position, while the recirculating damper 7 will be shifted to closed position. Soon as the pivotal point 62, between the arm 58 and the link 59, passes the dead center with respect to the shaft 24, the two doors 7 and 8 will quickly shift under the pull of the spring 60 to the positions, respectively, just indicated. The reverse action of the dampers 7 and 8 will take place if the crank pin 62 is shifted in the reverse direction to a position beyond the dead center of the shaft 24; that is to say, the two dampers will be, respectively, shifted to the position shown in Figure 5, thus shutting off the entrance of fresh air or heat and fluid through the inlet damper to the chamber 5; and the normal operation of this controlling mechanism is to cause the pivotal point 62 to pass the dead center when operating in either direction. The spring will operate to shift the dampers 7 and 8 to the extreme of their respective movements when once started in a given direction; but, should the emergency arise which would fuse the link 32, the automatic operations heretofore described would be performed regardless of the floating link 59.

Figure 9:
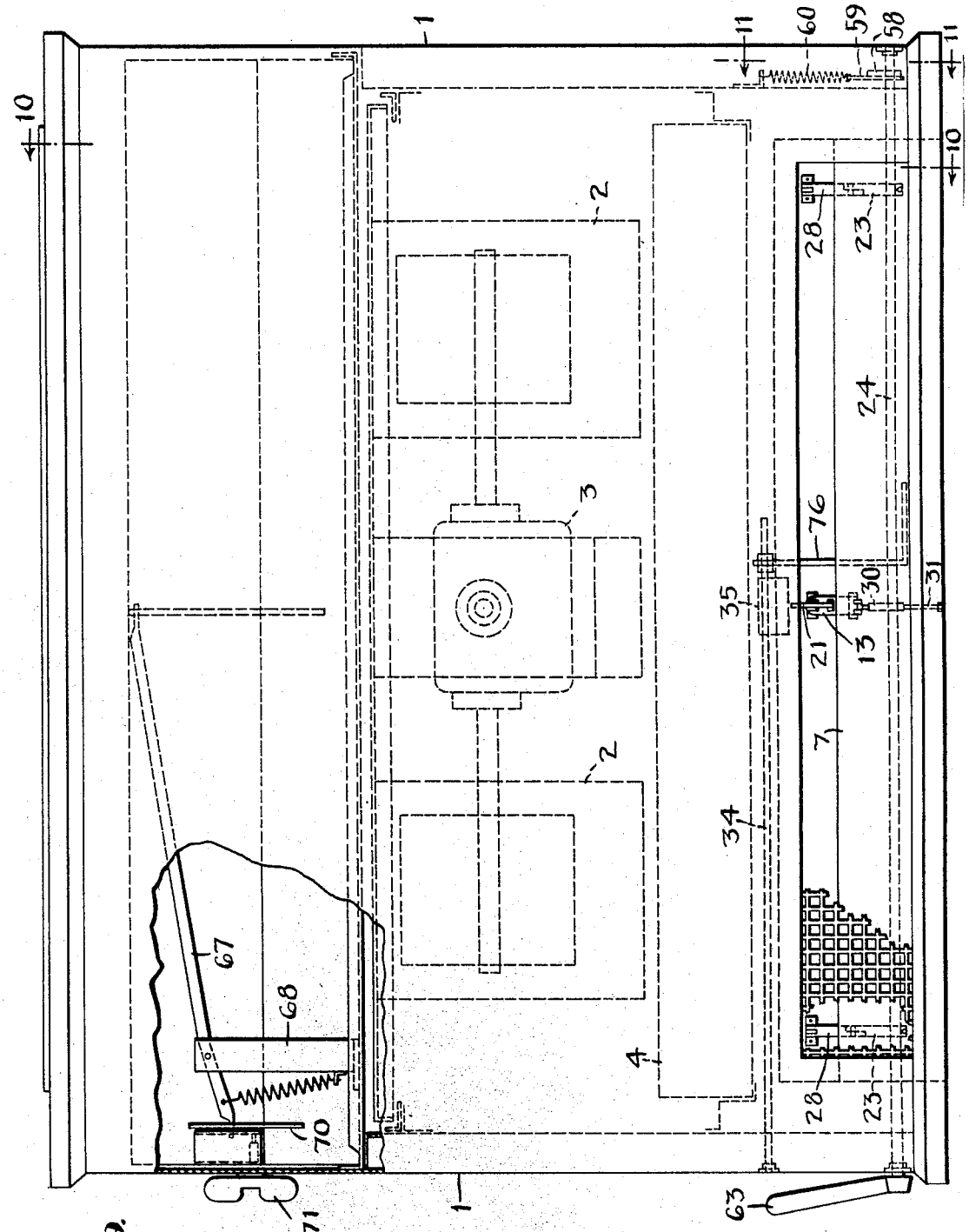
Figure 9 is a view similar to Figure 1 showing the mechanism manipulated by manual means.
Figure 10:
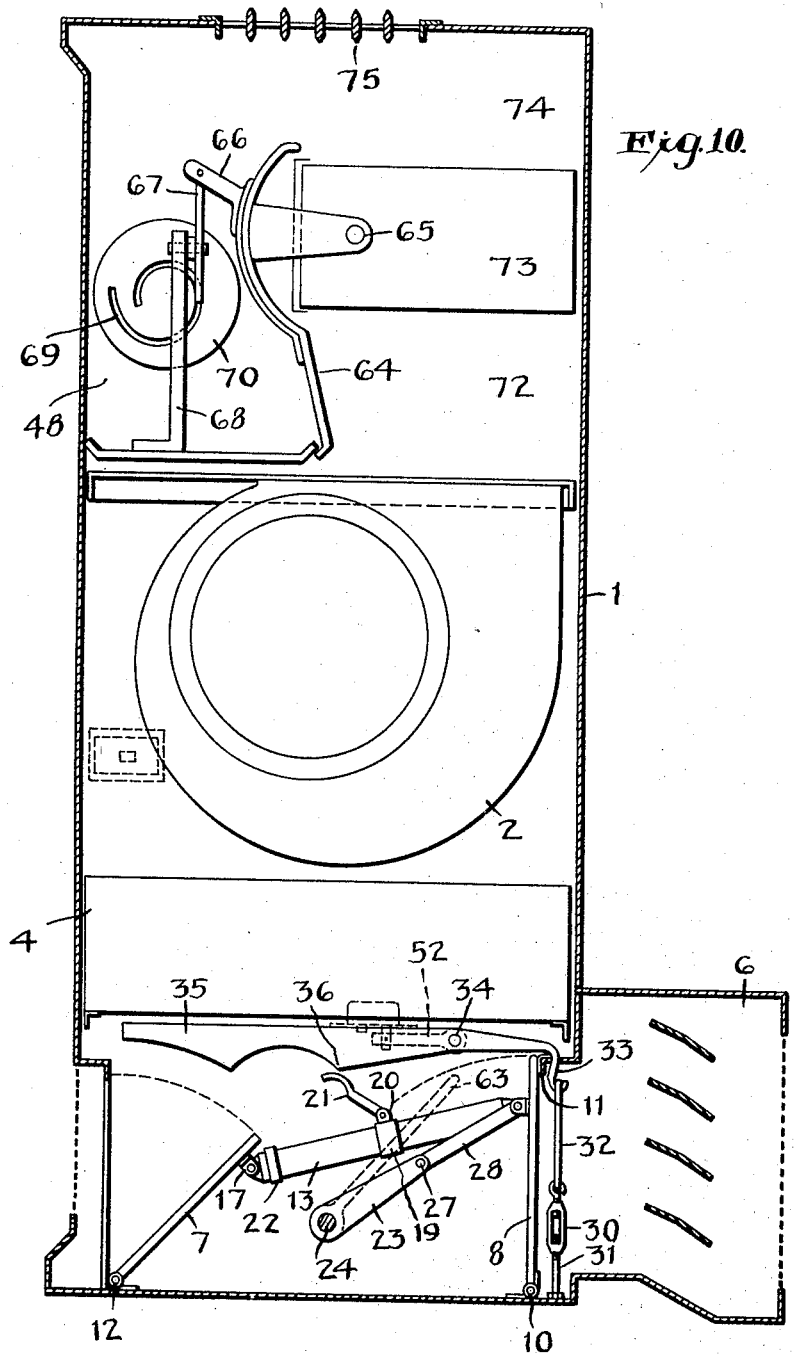
Figure 10 is a view similar to Figure 2 taken on the line 10—10 of Figure 9.

As shown in Figures 9 to 11, the shaft 24 may be operated by hand instead of by the sylphon motor in the upper part of the casing. In any event, it will be understood that normally, as the dampers are shifted, the spring 60, link 59 and arm 58 will be so positioned and related as to cause the shaft 24 to go through a complete operation of opening or closing the respective dampers; but, in case of emergency, the operation of the link 59 will be controlled by the expansion mechanism which will automatically close the damper which may happen to be open. This operation is shown in Figure 4, wherein the expansion mechanism has been released to operate upon both the dampers. If the sylphon is not employed, the momentary contact will nevertheless be so operated as to release control of the shaft 24, break the motor circuit and stop the fans.

With the foregoing detail description it is believed that the various functions and modes of operation will be clearly understood; but, I desire to lay stress upon the fact that I have produced a combination of mechanisms which will operate to shut down the motor, stop the fans, close the fire damper and the recirculating damper, and automatically lock the same in position such that the ingress of fluids is prevented in case of emergency, and at the same time operate to positively lock the fire damper shut and render it well-nigh impossible to open the same by external pressure short of what may be termed a breaking or destructive pressure; and all these operations are and may be carried out automatically or by hand.

If hand manipulating means for the rock-shaft 24 be employed, as shown in Figures 9 to 11, it may consist of a crank-arm 63 fixed to one end of said rock-shaft 24 just outside one end of the casing. By this means the shaft 24 can be actuated so as to shift the pivotal connection 62 one way or the other, as may be required, past the dead center of the shaft 24, whereupon the link 59 under the influence of the spring 60 will be carried over so as to complete the movement started by the operator, one or the other of the dampers 7, 8 being closed or opened and the movement of said dampers being completed to the extreme position.

In units of this character the by-pass damper 64 may be either automatically operated as by a sylphon motor or other form of pump, or it may be manipulated by hand. In Figures 1 to 8, inclusive, I have shown no means for operating the by-pass damper 64 in order to avoid confusion with the more important mechanism of my present invention. In Figures 9 to 11, I have shown the by-pass damper as a combined by-pass and cut-off damper such as is made the subject of my joint application filed April 25, 1930, Ser. No. 447,271 Patent #1,885,243; but, in said figures I have shown only enough of said mechanism to identify the same and suggest its mode of operation. In Figures 9 and 10, the double damper is shown as pivoted at 65 and connected by an arm 66 to an actuating lever 67 fulcrumed to a bracket 68 and having its short arm engaged in a spiral track 69 of a rotary member 70 having hand manipulating means 71 located outside the casing at one end thereof above the crank-arm 63. This mechanism is located in the by-pass and mixing chamber 48, which latter is extended into a cold air chamber 72 occupied in its upper portion by a heating element 73 through which the fresh air is driven by the blowers into the mixing and discharge chamber 74, through the grille 75 in the top of the unit. It will be understood that all these parts are practically the same as in my aforesaid joint application.

As shown herein, the toggle mechanism 23—28 is duplicated at opposite ends of the casing, this being for the purpose of imparting a steady movement to the inlet and recirculating dampers and avoiding any twisting or extra strain thereon.

As shown in Figures 1 and 9, the rockshaft 34 does not extend throughout the length of the casing, the same being caused to terminate, at its inner end, approximately midway of the length of the casing where it is supported in a suitable journal bearing generally indicated at 76.

Having thus described my invention, what I claim and desire to secure by Letters Patent is:

1. A heating and ventilating unit including a recirculating damper, in combination with a fire damper, means for actuating the fire damper including means for compelling the same to close in the presence of flame or a rise in temperature of predetermined degree, and means whereby in the event just stated the recirculating damper will be closed and the fire damper will be simultaneously locked.

2. A heating and ventilating unit including in its structure a fresh air inlet damper and a recirculating damper, in combination with means for connecting said dampers for simultaneous operation, means for actuating the inlet damper to close the same in an emergency, and means including the said connection whereby the recirculating damper will be closed and the fresh air damper will also be simultaneously locked.

3. A heating and ventilating unit including a fire protection damper and a recirculating damper, means connecting the two dampers including power means, a trigger, and means whereby it may be set to hold the power means inactive, and means whereby the trigger may be tripped to release the power means to enable the latter to operate upon one or the other of said dampers to close the same.

4. A heating and ventilating unit having an inlet damper and a recirculating damper, a connection between the two dampers normally functioning as a link, and including power means, means for holding power stored in said means, and means for tripping the holding means so that the power mechanism may operate to close one or the other of said dampers.

5. A heating and ventilating unit including an inlet chamber, a fire damper for closing the inlet chamber at one side, a recirculating damper closing the chamber at the other side, power means connecting the two dampers, tripping means adapted to release the power means, and means located in the inlet chamber for releasing the tripping means whereby said power means may close either one of said dampers.

6. A heating and ventilating unit such as defined in claim 5 wherein a fusible link is included in the means located in the inlet chamber to activate the power means.

7. A heating and ventilating unit such as defined in claim 5 wherein a toggle mechanism is employed for locking the fire damper in closed position.

8. A heating and ventilating unit such as defined in claim 5 and which includes a motor and blower, and wherein a fusible link is included adapted to trip the power means into action, together with means whereby the motor and blowers may be put out of action.

9. A heating and ventilating unit such as defined in claim 5 wherein a toggle means is employed for locking the fire damper closed, coupled with a motor for activating the toggle means.

10. A heating and ventilating unit such as defined in claim 5 wherein the power means includes a telescopic link.

11. A heating and ventilating unit such as defined in claim 5 wherein the power means includes a tubular, telescopic link enclosing an expansion spring.

12. A heating and ventilating unit such as defined in claim 5 wherein is included a mechanism by which, when the dampers are shifted for closing purposes, the movement thereof is continued until the functional operation is completed.

13. A heating and ventilating unit such as defined in claim 5 wherein the activating means includes a fusible link set in a position transversely of the fire damper.

14. A heating and ventilating unit having mechanism such as defined in claim 5 and which includes a motor and blower, in combination with a fusible link for activating the power means, and a bell-crank lever carrying a contact device for stopping the motor and blower of the unit.

15. A heating and ventilating unit such as defined in claim 5 which also includes, in combination, a means for shifting either of the dampers from one extreme to the other.

16. A heating and ventilating unit having a fire damper protection means and a recirculating damper, means for activating the two dampers including devices for causing the fire damper to move into closed position, and means for positively locking the fire damper against external pressure.

17. A heating and ventilating unit comprising a fire damper, a recirculating damper, a positive lock for the fire damper, a means for closing one of the dampers when the other is closed, fans and a motor for drawing air through the unit, and a combination of means including a fusible link for stopping the motor and fans, for tripping the positive lock and for activating the damper-closing means.

WARREN EWALD.